July 24, 1934.   C. J. ÖSTMAN   1,967,449
HAND WIND GAUGE
Filed June 23, 1931
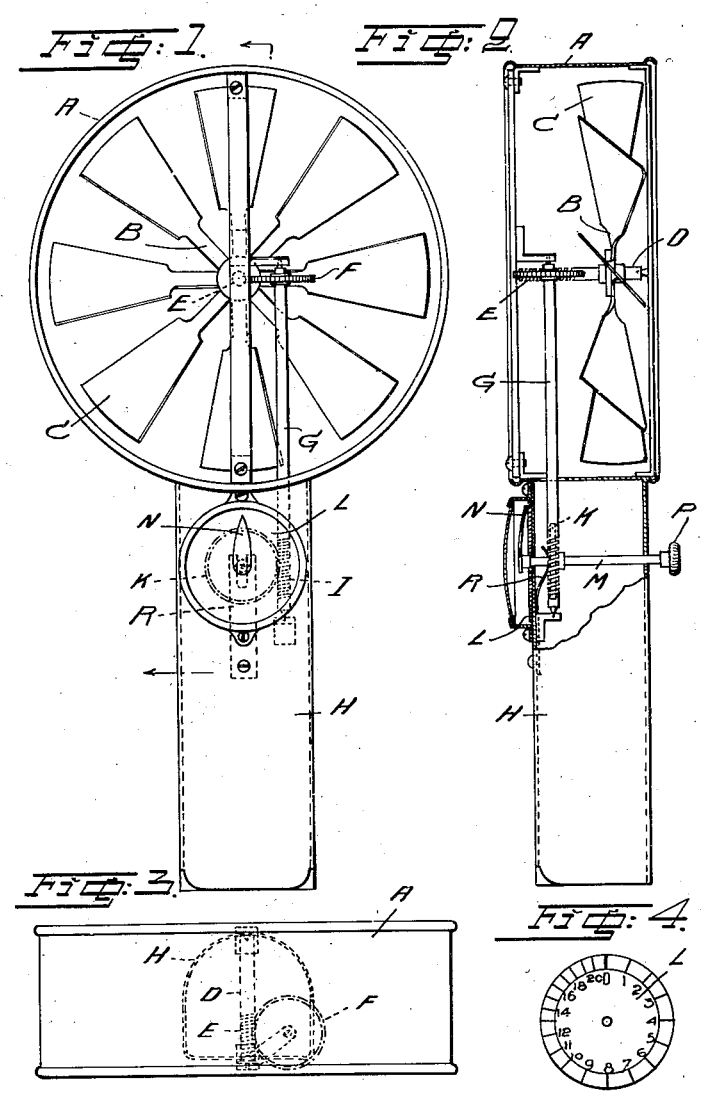
C. J. Östman
INVENTOR
By: Marks & Clerk
ATTys.

Patented July 24, 1934

1,967,449

UNITED STATES PATENT OFFICE 1,967,449

HAND WIND GAUGE

Carl Johan Östman, Stockholm, Sweden

Application June 23, 1931, Serial No. 546,379
In Sweden March 11, 1930

2 Claims. (Cl. 73—2)

This invention relates to an arrangement in hand wind gauges and more particularly to the indicating device of the same and the mechanism through which the movement of the member acted upon by the wind is transmitted to the said device.

The different types of instruments for measuring the force of the wind or an air current are based substantially on the following three principles: indicating the pressure, which the wind of a certain power effects on a diaphragm of certain dimensions, measuring the suction or the pressure action, which is effected by the air current in a pitot-tube and finally measuring the velocity of a cup anemometer and windwheel anemometer effected by different powers of the wind. The type of wind gauge here in question is based on the principle last mentioned.

A drawback of the existing wind gauge consists therein that the connection of the indicating device to the driving mechanism and the disengaging of the same and the adjusting of the indicating device into the zero position can not be effected by manipulations with the hand by means of which the instrument is held during the measuring operation. The said drawback often causes troubles, especially due to the fact that a watch preferably may be held by the other hand. Besides, the possibility of starting immediately a new measurement without circumstantial movements of the hand or other adjusting operations, is necessary, if the measurement already started must be interrupted for some reason. The object of this invention is to introduce the said possibility and remove the drawback mentioned above.

A form of execution of the invention is illustrated in the accompanying drawing, in which Figures 1, 2 and 3 show the hand wind gauge in a front view, side view, partially in section, and a top view respectively, Fig. 4 shows a detail.

The main parts of the hand wind gauge are the frame A, the windwheel B and the handle H. The frame A consists of a band bent into a circle. Inside the said frame the rotatable windwheel B is located, which consists of a number of blades C twisted longitudinally of their centre-line and forming an angle with the rotary shaft D. The one end of the shaft D is provided with a worm E which transmits the rotary motion of the windwheel to a wormwheel F, which is fixed to an upright shaft G extending downwards into the hollow handle H. The lower end of the said shaft G is also provided with a worm I having the same pitch as the worm first mentioned. The worm I rotates a wormwheel K mounted in the handle and having the same dimensions as the worm wheel provided on the top end of the shaft. The one side of the handle, the so called front side, is plane while its rear side is rounded. A circular dial-plate L is engraved on the front side of the handle or fixed to the same and provided with lines and numerals which after the device has been connected up and run a predetermined length of time will show the velocity of the wind by meters per second. The shaft M of the wormwheel last mentioned extends through the centre of the dial-plate and to its end a pointer N is fixed. The said shaft may be moved longitudinally by means of a button P with fluted edge and provided at the rear side of the handle. Owing to the said arrangement it is possible to bring the worm wheel K out of engagement with the worm I, when necessary. A spring R on the shaft returns the wormwheel and causes the same to re-engage the worm.

As the windwheel is rotated by the wind the pointer N evidently is rotated. The pointer, however, is at a standstill, as the button P has been forced inward by a finger and held in this position. The shaft of the pointer may also be rotated by moving the said finger bearing against the side of the button in the one or the other direction. Not only for making room for the mechanism just described but also for the fixing of the gauge on a rod the handle of the gauge is rendered hollow.

For the measuring of the velocity of the wind the gauge is held by one hand, while the arm is stretched straight upward. At the starting of the measurement the pointer ought to be located at the zero line of the dial L and the button at the rear side of the handle held in its inner position. At a certain moment of time the button is released and after the lapse of a minute the button is again forced inward. The wormwheel K, which transmits the movement of the wind-wheel to the pointer, is hereby disengaged, so that the pointer is brought to a standstill. The position of the pointer is read off and the number at which the pointer has stopped indicates the velocity of the wind. Consequently, the instrument is so arranged, that the velocity of the wind may be read off directly through the pointer, which on the graduated dial indicates the same directly by meters per second. During the measuring operation the observer ought to be turned against the wind and the wind must be permitted to pass straight through the frame of the instrument, at the top part of which a streamer may be provided as assistant means for ascertaining that so really is the case. The worm-wheel K may, if wanted, be mounted farther on to the shaft M or the distance between the same and the front side of the handle may be somewhat increased. Owing to this arrangement the instrument operates in a manner contrary to the one stated above, viz. in such manner, that the pointer is connected to the driving mechanism as the button K is held in its inner position.

I claim:—

1. In a wind gauge, the combination of a casing open at its front, a shaft journaled in the casing and carrying a windwheel, a closed casing adapted to be grasped in the hand attached to the side of the open casing, a rod extending through said handle casing below the open side of the windwheel casing, an indicating hand on one end of said rod and a dial on one side of said handle casing, said rod extending through the other side of the handle casing, and motion transmitting means between said windwheel shaft and said indicator rod, said transmitting means including a gear element that may be moved by endwise movement of said rod to connect and disconnect said windwheel and said indicator hand, whereby said gauge handle may be held in one hand and said rod moved longitudinally with one finger of the same hand to disconnect the windwheel from the indicator and said indicator returned to starting position.

2. In a wind gauge, the combination of an open casing, a shaft journaled in the casing and carrying a windwheel, a closed casing adapted to be grasped in the hand attached to the side of the open casing, a rod extending transversely through said handle casing, an indicating hand on one end of said rod and a dial on one side of said handle casing, said rod extending through the other side of the handle casing, and motion transmitting means between said wind-wheel shaft and said indicator rod, said transmitting means including a worm gear, in which the worm wheel is fixed on the said rod to connect and disconnect by endwise movement of the rod the said windwheel and said indicator hand whereby said gauge handle may be held in one hand and said rod moved longitudinally with one finger of the same hand to disconnect the windwheel from the indicator and said indicator returned to starting position.

CARL JOHAN ÖSTMAN.